Patented May 25, 1937

2,081,309

UNITED STATES PATENT OFFICE 2,081,309

PROCESS FOR TREATING OILS

Walter A. Schulze, Bartlesville, Okla., assignor to Phillips Petroleum Company, Bartlesville, Okla., a corporation of Delaware No Drawing. Application March 18, 1935, Serial No. 11,733

7 Claims. (Cl. 196—44)

The present invention relates to a novel and improved process for treating and stabilizing hydrocarbon oils. More specifically, this invention has particular relation to a new process for imparting stability to hydrocarbon oils after the latter have been subjected to a purifying treatment involving the use of copper-containing reagents.

Hydrocarbon oils, and in particular, kerosene, gasoline and similar petroleum distillates usually contain considerable amounts of sulfur, generally in the form of mercaptans and other malodorous and corrosive impurities. In treating such hydrocarbon oils to purify and improve them, use is frequently made of copper chloride and other copper salts, as well as salts of the other heavy metals such as mercury, for the purpose of removing such offensive impurities or converting them into harmless forms.

Mercury compounds resulting from the purification treatment are adsorbed and retained by the treated oil and have been removed therefrom by making use of hydrogen sulfide or the like as a precipitating agent. However, copper salts of inorganic acids are insoluble in hydrocarbon oils, and where a copper reagent has heretofore been employed in the oil purification, the removal of the copper salts has not been an issue. Ordinary analytical methods show copper treated oils, such as applicant proposes to stabilize, to be substantially copper free. Henderson (U. S. Patent No. 1,815,563) points out that there was no loss of copper from his solution and accordingly makes no provision for removing copper from the treated oil; and this is representative of the accepted practice.

Oils treated with these copper reagents, however, in spite of their apparently copper-free condition, are found to exhibit a progressive tendency to discolor following the use of these reagents, or to have an increased tendency to form involatile resinous matter, polymers, and malodorous constituents.

Accordingly, a primary object of the present invention is the treatment of oils of the character aforementioned to stabilize them against such deterioration after the use of copper compounds in the purification treatment thereof as above described.

A still further object of this invention is to reduce, delay or prevent the formation of resinous matter, polymers, and malodorous products.

The foregoing and other objects, which will be apparent to those skilled in the art to which the present invention pertains from the disclosure thereof hereinafter set forth, are attained by the invention described in detail below.

Applicant has discovered that the increased tendency to undergo the deterioratory changes above stated is due to the initiation or acceleration of oxidation and condensation reactions by minute concentrations of compounds of copper, such as mercaptides, naphthenates or the like, which, contrary to accepted belief, are present in the copper reagent treated oil, and which act as catalysts.

Copper compounds are notorious oxidation catalysts. Traces of copper too small to detect by ordinary methods have been actually estimated by conducting oxidation of sulphites by oxygen in the presence of the suspected copper. This has given rise to the problem of stabilizing such oils against deterioration through catalytic oxidation, which is peculiar to copper reagent treating, and which applicant has solved by the present invention.

Schulze (the present applicant) and Frey in application Serial No. 585,389, filed January 7, 1932, and issued as U. S. Patent No. 1,980,555 on November 13, 1934, described a method for stabilizing an oil treated with copper and which exhibited discoloring and/or formation of resinous matter, polymers and oxidation products; that is, a method of treatment to delay, reduce or prevent such changes, by bringing the oil into intimate contact with an alkaline sulphide solution subsequent to treating with the copper reagent.

The applicant has now discovered that certain improvements and advantages over the aforementioned method can be obtained by impregnating a solid adsorbent carrier material such as fuller's earth, charcoal or the like, with the alkaline sulphide solution and employing this solid reagent for stabilizing the oil previously treated with a metallic salt solution, e. g. copper chloride solution. The oil can be merely filtered over the adsorbent treating material or it can be contacted by any one of the means commonly employed for treating an oil in the liquid phase with solid granular adsorbent type materials.

While it is possible to prepare the treating reagent in any one of a number of ways, the preferred method is to spray a concentrated solution of an alkaline sulphide, such as sodium sulphide, onto the solid adsorbent material used for the carrier. Any inorganic sulphide capable of yielding sulphide or hydrosulphide ions in solution may effectively be used. Alkalies which have been used to purify oils and gases containing hydrogen sulphide will contain soluble sulphides and may be used, preferably after removal of mercaptans by distillation or equivalent means, to impregnate the solid adsorbent material.

As stated above, the reagent is prepared by impregnating the adsorbent with a solution of the alkaline sulphide. In this way a great part of the surface is covered and the pores are partially filled with the treating solution. If a relatively concentrated solution of the alkaline sulphide is used, then none of the solvent need be removed from the material before use. The presence of an appreciable amount of solvent in the reagent is particularly desirable since the reaction with the metallic compounds in the oil proceeds much more rapidly under such conditions than when only a relatively small amount of solvent is present. The maximum amount of water depends, of course, on the adsorbent itself since it is necessary that the reagent not be so moist as to prevent filtering of the liquid oil through it. It has been found that the usual difficulties encountered in filtering liquid oils through a bed of reagent somewhat moist with water can be entirely avoided by the use of larger-sized particles. Thus, when a reagent consisting of 5 to 20 per cent of sodium sulphide on fuller's earth and/or charcoal of 10 to 40 mesh is employed, the drop in pressure through the bed although quite moist, is practically negligible, being of the order of several pounds only, whereas when fine particles, such as 30 to 60 mesh fuller's earth are employed the drop in pressure is several times more when the moisture content of the reagent is no greater than in the first case, the pressure drop, of course, depending upon the rate of passage of the liquids through the reagent bed.

The concentration of the sodium sulphide on the adsorbent may vary within wide limits without seriously impairing its effectiveness. A concentration as low as 0.5 per cent is effective. A concentration in the neighborhood of 10 to 20 per cent usually gives best results. A high alkalinity is also to be preferred because it insures the absence of hydrogen sulphide in the treated oil. For this reason the addition of sodium hydroxide, preferably to the extent of 5 to 10 per cent, to the sulphide solution before spraying it on the adsorbent is desirable.

The applicant has discovered, too, that the alkaline sulfide may be dissolved in an alcoholic solution or in a mixture of water and alcohol, and the adsorbent carrier impregnated with this solution. The "alcoholic" reagent is preferred in treating certain oils since the removal of the organic metallic compounds from the oil can be accomplished somewhat more readily.

The stabilizing of copper treated oils with this solid alkaline sulfide reagent is completed within a relatively short time even at ordinary temperatures. However, higher temperatures can be employed if desired. If too high temperatures are used the solvent will, of course, be driven off and means will need to be provided to keep the moisture content of the reagent in a relatively stable state.

While adsorbent materials such as fuller's earth and charcoal are preferred as carriers for the alkaline sulphide solution, other adsorbent materials such as Sil-o-cel, pumice, etc., may be used. Materials of a neutral or alkaline character are preferred inasmuch as the treating solution is in itself alkaline. Adsorbent materials which are reactive to such alkaline solutions, of course, cannot be used as carriers.

As an example of the application of the process according to the present invention, a cracked gasoline which had been sweetened by treatment with a moist copper chloride reagent comprising fuller's earth impregnated with a solution of copper chloride was filtered through a bed of fuller's earth impregnated with a solution of sodium sulphide and sodium hydroxide. A portion of this gasoline before treatment with the alkaline sulfide reagent became quite yellow in color during a storage period of one day, whereas another portion of the gasoline which was filtered over the alkaline sulphide reagent lost less than 2 points in color on the Saybolt scale during a storage period of thirty days. The nonvolatile residue from a 50 cc. portion of the gasoline treated with the alkaline sulfide reagent was almost negligible whereas the residue from an equal portion of the unstabilized gasoline which had been stored for thirty days mounted to about 10 milligrams.

The stabilizing treatment disclosed herein can be applied to petroleum oils which have previously been sweetened by either so-called wet or dry methods. Its advantages can be most completely utilized when the oil is sweetened by filtering over a reagent comprising a solid adsorbent impregnated with a copper chloride solution. In such a case, the oil may be passed from the filter containing the sweetening reagent directly to a second filter comprising the stabilizing reagent disclosed herein. The oil is, therefore, completely sweetened and stabilized by an extremely simple operation merely comprising a two stage filtering process.

The method of stabilization as disclosed herein has many advantages. The investment costs for such a unit amount to very little and the operation and service costs are quite low; therefore this invention constitutes an extremely economical method. Moreover, there is no carry-over of treating agent to contaminate the pipe lines and storage tanks, a common occurrence when treating with liquid reagents.

It is evident from the foregoing that the applicant has discovered and disclosed a new method of stabilizing copper reagent treated oils which constitutes an important technical step forward in the art.

Having described my invention, what I claim is:

1. The method of stabilizing petroleum oil, which has been treated with a metallic salt reagent, against catalytic deterioration, which comprises bringing said oil in liquid phase into intimate contact with an adsorbent carrier material impregnated with an aqueous solution of a sulphide selected from the group consisting of the alkali and alkaline earth metals, and separating the stabilized oil from the adsorbent material.

2. In the refining of oil with a compound of copper, the steps of subsequently contacting the oil with a treating agent comprising an adsorbent carrier material impregnated with an aqueous solution of an alkaline sulphide, whereby the traces of copper compounds are removed and the oil is stabilized, and separating the stabilized oil from the treating agent.

3. The method of improving sour petroleum oil, comprising contacting the oil with a copper sweetening reagent, separating the sweetened oil from the copper reagent, contacting the sweetened oil with a stabilizing agent consisting of an adsorbent carrier material impregnated with a solution of an alkaline sulphide and an alkali, whereby the oil is stabilized against catalytic deterioration, and separating the stabilized oil from the stabilizing agent.

4. The method of stabilizing petroleum oil which has been treated with a copper reagent, which comprises passing said oil in liquid phase through a filter bed of treating agent consisting of fuller's earth impregnated with an aqueous solution of sodium sulphide and sodium hydroxide, whereby the oil is stabilized against catalytic deterioration, and then separating the stabilized oil from the treating agent.

5. The method of stabilizing petroleum oil which has been treated with a copper reagent, which comprises passing said oil in liquid phase through a filter bed of treating agent consisting of fuller's earth impregnated with an aqueous solution of a soluble sulphide and an alkali, whereby the oil is stabilized against catalytic deterioration, and then separating the stabilized oil from the treating agent.

6. The method of stabilizing petroleum oil which has been treated with a copper reagent, which comprises passing said oil in liquid phase through a filter bed of treating agent consisting of adsorbent carrier material impregnated with an aqueous solution of an alkali and a compound capable of yielding sulphide or hydrosulphide ions, whereby the oil is stabilized against catalytic deterioration, and then separating the stabilized oil from the treating agent.

7. The method of stabilizing volatile petroleum oils which have been sweetened with copper chloride, against catalytic deterioration, which comprises bringing said oil in liquid phase into intimate contact with an adsorbent carrier material impregnated with an aqueous solution of a sulphide selected from the group consisting of the alkali and alkaline earth metals, and separating the stabilized oil from the adsorbent material.

WALTER A. SCHULZE.